(12) United States Patent
Sterzel

(10) Patent No.: US 7,223,378 B2
(45) Date of Patent: May 29, 2007

(54) PREPARATION OF BARIUM TITANATE OR STRONTIUM TITANATE HAVING A MEAN DIAMETER OF LESS THAN 10 NANOMETERS

(75) Inventor: Hans-Josef Sterzel, Dannstadt-Schauernheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 553 days.

(21) Appl. No.: 10/435,457

(22) Filed: May 12, 2003

(65) Prior Publication Data

US 2003/0215384 A1    Nov. 20, 2003

(30) Foreign Application Priority Data

May 14, 2002  (DE) ................. 102 21 499
Jul. 18, 2002   (DE) ................. 102 32 791

(51) Int. Cl.
*C01F 11/00*    (2006.01)
*C01G 1/00*     (2006.01)
*C01G 23/00*   (2006.01)

(52) U.S. Cl. ............... 423/598; 423/69; 423/71; 423/84; 423/594.16; 501/136; 501/137

(58) Field of Classification Search ........... 423/598, 423/594.16, 69, 155, 71, 84; 361/321.1, 361/321.4, 321.5; 501/136, 137; 977/776, 977/811, 812

See application file for complete search history.

(56) References Cited

U.S. PATENT DOCUMENTS

| | | | |
|---|---|---|---|
| 3,647,364 A | | 3/1972 | Mazdfyaani et al. |
| 4,587,041 A | | 5/1986 | Uedaira et al. |
| 4,764,493 A | * | 8/1988 | Lilley et al. ............... 501/137 |
| 4,968,498 A | | 11/1990 | Wautier et al. |
| 5,668,694 A | * | 9/1997 | Sato et al. ............... 361/321.4 |
| 6,616,794 B2 | * | 9/2003 | Hartman et al. ......... 156/306.9 |
| 6,733,740 B1 | * | 5/2004 | Costantino et al. ......... 423/598 |
| 2003/0214776 A1 | | 11/2003 | Sterzel et al. |
| 2004/0107555 A1 | * | 6/2004 | Hattori et al. ............. 29/25.42 |

FOREIGN PATENT DOCUMENTS

WO    WO 03/096362 A2    5/2003

OTHER PUBLICATIONS

The English abstract of JP 02000281338 A dated Oct. 10, 2000 to Mitate et al.*
The English abstract of EP 250085 A dated Dec. 23, 1987 to Lilley et al.*
The English abstract of JP 2002060219 A dated Feb. 26, 2002 to Murata Mfg. Co.*
The English abstract of JP 05078129 A dated Mar. 30, 1993 to Murata Mfg. Co.*
The English translation of Japan Patent Document No. 2002-60219 A published on Feb. 26, 2002.*
J. Am. Ceramic Soc., Oct. 21, 1969, vol. 52, No. 10, Mazdiyasni et al., 523-526.
HighTech. Ceramics, 1987, 1459-1468, Chaput et al.
Chang-Tai Xia et al.; "Hydrothermal Synthesis of BaTiO3 nano/Microcrystals"; Journal of Crystal Growth; vol. 166; pp. 961-966; 1996.

* cited by examiner

*Primary Examiner*—Timothy C. Vanoy
(74) *Attorney, Agent, or Firm*—Novak Druce & Quigg, LLP

(57) ABSTRACT

Process for preparing barium titanate or strontium titanate by reacting titanium alkoxides with barium hydroxide hydrate or strontium hydroxide hydrate in a $C_1$–$C_8$-alcohol or a glycol ether at from 50 to 150° C.

3 Claims, No Drawings

PREPARATION OF BARIUM TITANATE OR STRONTIUM TITANATE HAVING A MEAN DIAMETER OF LESS THAN 10 NANOMETERS

The present invention relates to a process for preparing barium titanate or strontium titanate by reaction of titanium alkoxides with barium hydroxide hydrate or strontium hydroxide hydrate in an alcohol or a glycol ether at elevated temperature.

J. Am. Ceram. Soc., Vol. 52, No. 10, pages 523 to 526 (1969), discloses the preparation of barium titanate powders from barium isopropoxide and titanium tetra-tert-pentoxide in a solvent under reflux and subsequent dropwise addition of water. The particle size of the crystalline material after drying at 50° C. is from 5 to 15 nm. Heating to at least 900° C. is necessary to remove organic residues, and this leaves carbon in the titanate, which is responsible for high leakage currents and is a drawback when the titanate is used as capacitor material.

High Tech Ceramics, 1987, pages 1459 to 1468, discloses a process for preparing carbon-free barium titanates by introducing an aqueous barium hydroxide octahydrate solution into a solution of titanium tetra-n-butoxide in butanol, giving a gel which is dried at 100° C. and sintered at 1350° C. The particle size is about 1 μm.

A disadvantage of these processes is the size of the particles obtained or the residual carbon content.

It is an object of the present invention to remedy the abovementioned disadvantages.

We have found that this object is achieved by a new and improved process for preparing barium titanate or strontium titanate, which comprises reacting titanium alkoxides with barium hydroxide hydrate or strontium hydroxide hydrate in a $C_1$–$C_8$-alcohol or a glycol ether at from 50 to 150° C.

The process of the present invention can be carried out as follows:

Titanium alkoxides can be initially charged in a $C_1$–$C_8$-alkanol, a glycol ether or a mixture thereof, and reacted with barium hydroxide hydrate or strontium hydroxide hydrate at from 50 to 150° C., preferably from 60 to 120° C., in particular 70 to 110° C., particularly preferably at reflux temperature, and a pressure of from 0.1 to 3 bar, preferably from 0.5 to 2 bar, particularly preferably at atmospheric pressure.

The concentration of the alcoholic titanium alkoxide solution can be varied within wide limits. The concentration is preferably from 50 to 800 g/liter, particularly preferably from 100 to 600 g/liter, in particular from 200 to 400 g/liter.

Suitable barium or strontium hydroxide hydrates are the known hydroxide hydrates, e.g. barium or strontium hydroxide octahydrate.

Suitable titanium alkoxides are, for example, titanium tetramethoxide, titanium tetraethoxide, titanium tetra-n-propoxide, titanium tetraisopropoxide, titanium tetra-n-butoxide, titanium tetraisobutoxide, titanium tetra-sec-butoxide, titanium tetra-tert-butoxide, titanium tetra-n-pentoxide and titanium tetraisopentoxide, preferably titanium tetraethoxide, titanium tetra-n-propoxide, titanium tetraisopropoxide, titanium tetra-n-butoxide, titanium tetraisobutoxide, titanium tetra-sec-butoxide and titanium tetra-tert-butoxide, particularly preferably titanium tetra-n-propoxide, titanium tetraisopropoxide, titanium tetra-n-butoxide and titanium tetraisobutoxide, or mixtures thereof.

Suitable alcohols include $C_1$–$C_8$-alkanols, preferably $C_1$–$C_4$-alkanols such as methanol, ethanol, n-propanol, isopropanol, n-butanol, isobutanol, sec-butanol or tert-butanol, particularly preferably $C_1$–$C_3$-alkanols such as methanol, ethanol, n-propanol or isopropanol, in particular methanol or ethanol.

Suitable glycol ethers include all known glycol ethers such as ethylene glycol monomethyl ether, ethylene glycol monoethyl ether, ethylene glycol mono-n-propyl ether, ethylene glycol monoisopropyl ether, ethylene glycol mono-n-butyl ether, ethylene glycol monoisobutyl ether, ethylene glycol mono-sec-butyl ether, ethylene glycol tert-butyl ether, diethylene glycol monomethyl ether, diethylene glycol monoethyl ether, diethylene glycol mono-n-propyl ether, diethylene glycol monoisopropyl ether, diethylene glycol mono-n-butyl ether, diethylene glycol monoisobutyl ether, diethylene glycol mono-sec-butyl ether, diethylene glycol tert-butyl ether, preferably ethylene glycol monoethyl ether, ethylene glycol mono-n-propyl ether, ethylene glycol monoisopropyl ether, ethylene glycol mono-n-butyl ether, ethylene glycol monoisobutyl ether, ethylene glycol mono-sec-butyl ether, ethylene glycol tert-butyl ether, diethylene glycol monoethyl ether, diethylene glycol mono-n-propyl ether, diethylene glycol monoisopropyl ether, diethylene glycol mono-n-butyl ether, diethylene glycol monoisobutyl ether, diethylene glycol mono-sec-butyl ether and diethylene glycol tert-butyl ether, particularly preferably ethylene glycol mono-n-propyl ether, ethylene glycol monoisopropyl ether, ethylene glycol mono-n-butyl ether, ethylene glycol monoisobutyl ether, ethylene glycol mono-sec-butyl ether, ethylene glycol tert-butyl ether, diethylene glycol mono-n-propyl ether, diethylene glycol monoisopropyl ether, diethylene glycol mono-n-butyl ether, diethylene glycol monoisobutyl ether, diethylene glycol mono-sec-butyl ether and diethylene glycol tert-butyl ether, in particular ethylene glycol monoisopropyl ether, ethylene glycol monoisobutyl ether, ethylene glycol tert-butyl ether, diethylene glycol monoisopropyl ether, diethylene glycol monoisobutyl ether and diethylene glycol tert-butyl ether.

It can be advantageous to support the introduction of the barium or strontium hydroxide octahydrate by vigorous stirring.

In an advantageous embodiment, no additional water apart from the water from the hydroxide hydrate is introduced into the reaction.

In a preferred embodiment, part of the barium hydroxide octahydrate or strontium hydroxide octahydrate is replaced by anhydrous barium hydroxide or strontium hydroxide and a total of only from 2 to 4 mol of water per mole of titanate are introduced via the water of crystallization. This procedure leads to a pourable, stable suspension of the titanate particles in the alcohol or glycol ether.

If desired, doping elements such as Mg, Ca, Zn, Zr, V, Nb, Ta, Bi, Cr, Mo, W, Mn, Fe, Co, Ni, Pb, Ce or mixtures thereof, preferably Mg, Ca, Cr, Fe, Co, Ni, Pb or mixtures thereof, can be introduced, for example in the form of their hydroxides, oxides, carbonates, carboxylates or nitrates.

The barium titanates and strontium titanates prepared according to the present invention have a mean particle diameter of less than 10 nm, preferably from 0.5 to 9.9 nm, particularly preferably from 0.6 to 9 nm, in particular from 1 to 8 nm.

Barium titanate and strontium titanate or mixtures thereof are suitable as dielectrics and have relative dielectric constants of up to 5 000. They are suitable as dielectrics in capacitors, particularly in ceramic capacitors.

It is possible to coat commercial metal foils such as nickel foils with the dispersions according to the present invention in layer thicknesses of less than 0.5 μm, evaporate the alcohol or glycol ether and, preferably in the absence of oxygen, produce a correspondingly thin titanate layer on the metal foil and thus produce a rolled capacitor.

EXAMPLES

Example 1

Under an atmosphere of nitrogen, 716 g of anhydrous ethanol and 284 g (1 mol) of titanium tetraisopropoxide were heated under reflux and a mixture of 107.1 g (5/8 mol) of anhydrous barium hydroxide and 118.3 g (3/8 mol) of barium hydroxide octahydrate was added. After refluxing for 10 hours, the fluid suspension was cooled.

Examination of the sample by means of electron microscopy indicated very regular barium titanate particles having a diameter of about 2 nm. The barium titanate had a cubic crystal structure and the lattice constant $a_o$ was 0.4054 nm.

Part of the suspension was spray dried at about 180° C. This gave a very fine barium titanate powder having a Ba/TiO ratio of 0.139.

The dried powder was pressed to form a green body having a density of 2.12 g/cm$^3$. The specimen was sintered at 1 000° C. in air for a period of 5 hours to give a dense shaped body having a density of 5.92 g/cm$^3$.

Example 2

Using a procedure analogous to Example 1, 203.8 g of ethylene glycol mono-n-butyl ether und 71 g (250 mmol) of titanium tetraisopropoxide were heated to 100° C. and a mixture of 27.9 g (156 mmol) of anhydrous barium hydroxide and 29.6 g (94 mmol) of barium hydroxide octahydrate was added. After 21 hours at 100° C., the fluid suspension was cooled.

Examination of the sample by means of electron microscopy showed barium titanate particles having a diameter of from about 3 to 10 nm.

I claim:

1. A process for preparing barium titanate or strontium titanate, which comprises reacting titanium alkoxides with barium hydroxide hydrate or strontium hydroxide hydrate in a $C_1$–$C_8$-alcohol or a glycol ether at from 50 to 150° C., wherein no additional water apart from the water from the hydroxide hydrate is introduced into the reaction.

2. A process for preparing barium titanate or strontium titanate, which comprises reacting titanium alkoxides with barium hydroxide hydrate or strontium hydroxide hydrate in a $C_1$–$C_8$-alcohol or a glycol ether at from 50 to 150° C., wherein the barium hydroxide hydrate or strontium hydroxide hydrate is introduced into the solution in solid form.

3. A process for preparing barium titanate or strontium titanate comprising dissolving titanium alkoxides in a $C_1$–$C_8$-alcohol or a glycol ether, and introducing barium hydroxide hydrate or strontium hydroxide hydrate thereto in solid form to react with said titanium alkoxide at from 50 to 150° C., wherein the barium hydroxide hydrate or strontium hydroxide hydrate is introduced into the solution in solid form.

* * * * *